United States Patent
Buch

(10) Patent No.: US 12,461,811 B2
(45) Date of Patent: Nov. 4, 2025

(54) ERROR TYPE INDICATION

(71) Applicant: Micron Technology, Inc., Boise, ID (US)

(72) Inventor: Steffen Buch, Munich (DE)

(73) Assignee: Micron Technology, Inc., Boise, ID (US)

( * ) Notice: Subject to any disclaimer, the term of this patent is extended or adjusted under 35 U.S.C. 154(b) by 974 days.

(21) Appl. No.: 17/529,925

(22) Filed: Nov. 18, 2021

(65) Prior Publication Data

US 2022/0179733 A1   Jun. 9, 2022

Related U.S. Application Data

(60) Provisional application No. 63/121,744, filed on Dec. 4, 2020.

(51) Int. Cl.
*G06F 11/10*   (2006.01)
*G06F 3/06*   (2006.01)

(52) U.S. Cl.
CPC ............ *G06F 11/10* (2013.01); *G06F 3/0619* (2013.01); *G06F 3/0659* (2013.01); *G06F 3/0673* (2013.01)

(58) Field of Classification Search
CPC ...... G06F 11/10; G06F 3/0619; G06F 3/0659; G06F 3/0673; G06F 3/064; G06F 3/0688; G06F 11/1048; G11C 29/56008; G11C 2029/5604
USPC ........................................................ 714/799
See application file for complete search history.

(56) References Cited

U.S. PATENT DOCUMENTS

| | | | |
|---|---|---|---|
| 6,492,918 B1 * | 12/2002 | Rezzi ..................... | G11B 20/14 |
| 6,519,717 B1 * | 2/2003 | Williams ............ | G06F 11/1024 |
| | | | 714/E11.029 |
| 7,028,236 B2 * | 4/2006 | Okazaki ................ | G11C 29/56 |
| | | | 714/48 |
| 7,237,156 B1 | 6/2007 | Srinivasan et al. | |
| 7,441,169 B2 * | 10/2008 | Maeno .......... | G01R 31/318536 |
| | | | 714/724 |
| 7,571,375 B2 * | 8/2009 | Kim .................. | H03M 13/6563 |
| | | | 714/752 |
| 8,028,216 B1 * | 9/2011 | Yeo ................... | H03M 13/6362 |
| | | | 714/755 |

(Continued)

FOREIGN PATENT DOCUMENTS

| CN | 109215722 A | 1/2019 | |
|---|---|---|---|
| DE | 102021112203 A1 * | 3/2022 | .......... G06F 11/1048 |

OTHER PUBLICATIONS

Chinese patent office, "China Office Action," issued in connection with China Patent Application No. 202111445440.4 dated Jun. 6, 2025 (6 pages).

*Primary Examiner* — Albert Decady
*Assistant Examiner* — Enam Ahmed
(74) *Attorney, Agent, or Firm* — Holland & Hart LLP

(57) ABSTRACT

Methods, systems, and devices for error type indication are described. A memory device may detect an error while performing an error detection procedure for a codeword. The memory device may transmit to a host device one or more bits, which may be one or more error flags, that indicate the type of error detected by the memory device. By transmitting the one or more bits to a requesting device, for example a host device, the memory device may indicate the detected presence of a particular type of error in the set of data that is returned to the requesting device.

26 Claims, 9 Drawing Sheets

(56) References Cited

U.S. PATENT DOCUMENTS

| | | | | |
|---|---|---|---|---|
| 8,307,261 B2* | 11/2012 | Wu | ................. | H03M 13/6356 |
| | | | | 714/766 |
| 8,812,928 B2* | 8/2014 | Ha | ....................... | H03M 13/11 |
| | | | | 714/799 |
| 2003/0043749 A1* | 3/2003 | Tanaka | ................. | H03M 13/27 |
| | | | | 714/799 |
| 2009/0259922 A1* | 10/2009 | Garudadri | ............ | H04L 1/0045 |
| | | | | 714/799 |
| 2012/0124455 A1* | 5/2012 | Koshisaka | ........ | H03M 13/2915 |
| | | | | 714/799 |
| 2019/0012229 A1 | 1/2019 | Cha et al. | | |
| 2020/0278908 A1 | 9/2020 | Schaefer et al. | | |
| 2021/0049068 A1* | 2/2021 | Schaefer | ............... | H03M 13/05 |
| 2023/0198652 A1* | 6/2023 | Brox | ..................... | G11C 7/1006 |
| | | | | 370/342 |
| 2024/0028454 A1* | 1/2024 | Boehm | ............... | G06F 11/1048 |

* cited by examiner

ERROR TYPE INDICATION

CROSS REFERENCE

The present Application for Patent claims the benefit of U.S. Provisional Patent Application No. 63/121,744 by BUCH, entitled "ERROR TYPE INDICATION," filed Dec. 4, 2020, assigned to the assignee hereof, and expressly incorporated by reference herein.

FIELD OF TECHNOLOGY

The following relates generally to one or more systems for memory and more specifically to error type indication.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may increase reliability by performing error detection and correction on data read from a memory array of the device. To do so, the device may encode the data before storing the data in the memory array. Upon receipt of a read command, the device may read and decode the data so that the device can detect and correct any errors before, for example, sending the data to a requesting device (e.g., a host). A device that implements such an error correction scheme may encounter different types of errors, but may be unable to classify the errors or indicate the types of errors to a requesting device. Thus, the requesting device may be unaware of the type of error(s) detected, or corrected, or both by the device, which may negatively impact system performance.

According to the techniques described herein, a device may transmit, for example, to a requesting device (e.g., a host) one or more error flags that indicate the type of error, if any, detected, or corrected, or both in a set of data returned (e.g., already returned, returned concurrently, or to be returned) by the device. The error flags may be generated by circuitry coupled with a decoder of the device. The circuitry may perform logical operations on syndrome bits input into the decoder and error indication bits output by the decoder. The results of the logical operations may be one or more error flags, in the form of bits, that individually or collectively indicate a particular type of error in a codeword. By transmitting the error flags to a requesting device, the device may indicate the detected presence or absence of a particular type of error in the set of data that is returned to the requesting device.

Features of the disclosure are initially described in the context of a system as described with reference to FIG. 1. Features of the disclosure are described in the context of devices as described with reference to FIGS. 2-4. Additional features of the disclosure are described in the context of a process flow a described with reference to FIG. 5. These and other features of the disclosure are further illustrated by and described with reference to apparatus diagrams and flowcharts that relate to error type indication as described with reference to FIGS. 6-9.

Figure 1:
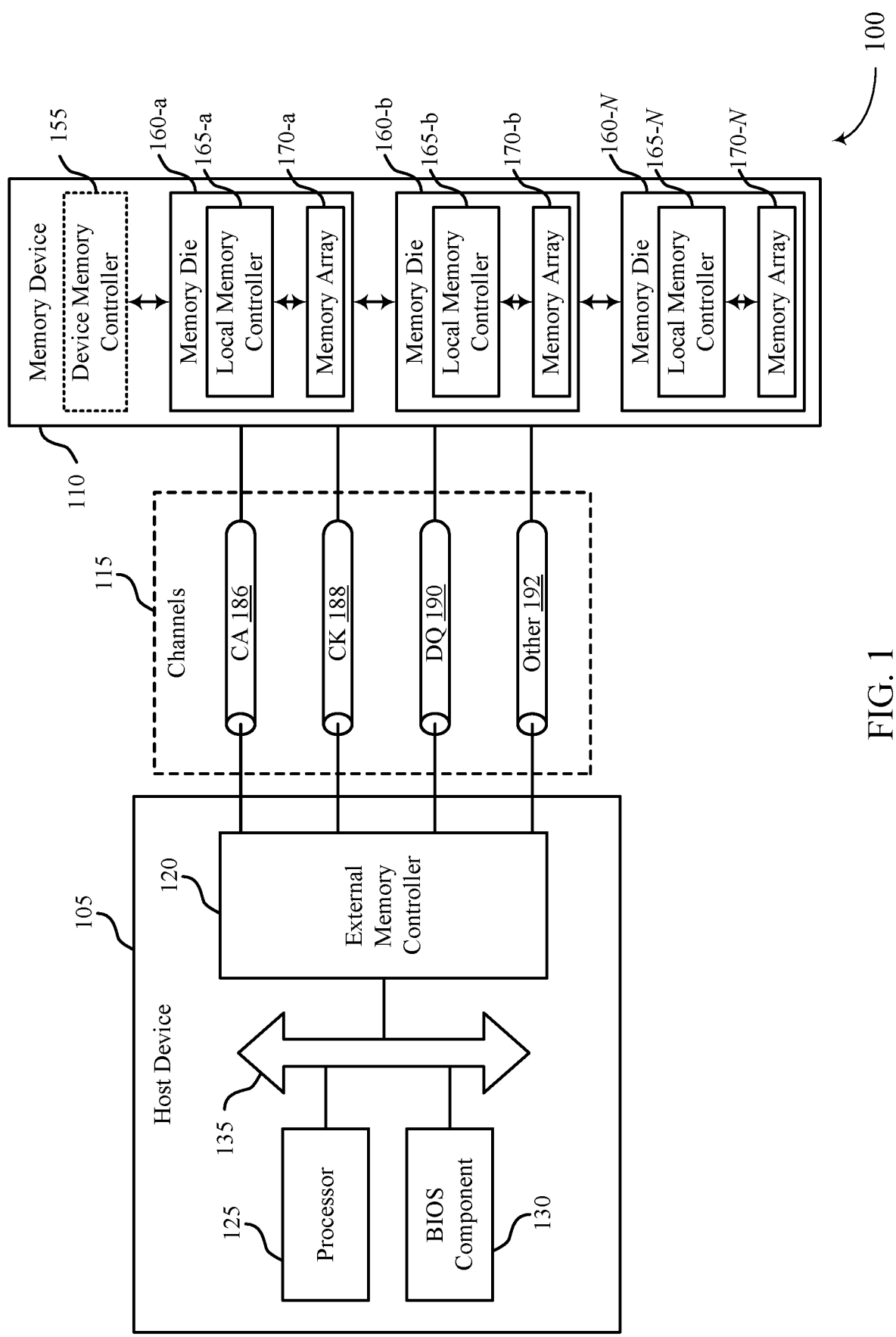
FIG. 1 illustrates an example of a system that supports error type indication in accordance with examples as disclosed herein.

FIG. 1 illustrates an example of a system 100 that supports error type indication in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

In some examples, the memory device 110 may include a device memory controller 155 and one or more memory dies 160 (e.g., memory chips) to support a desired capacity or a specified capacity for data storage. In some examples (e.g., in Low-Power Double Data Rate (LPDDR) applications), the memory device 110 may exclude the device memory controller 155. Each memory die 160 may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The system 100 may include any quantity of non-transitory computer readable media that support data separation for garbage collection. For example, the host device 105 or the memory device 110 may include or otherwise may access one or more non-transitory computer readable media storing instructions (e.g., firmware) for performing the functions ascribed herein to the host device 105 or the memory device 110. For example, such instructions, when executed by the host device 105 (e.g., by the processor 125 or the external memory controller 120) or by the memory device 110 (e.g., by device memory controller 155 or a local memory controller 165), may cause host device 105 or the memory device 110 to perform associated functions as described herein.

In some cases, data in the memory device 110 may be stored incorrectly or become corrupted over time, resulting in one or more errors in the data. To increase the reliability of the memory device 110, the memory device 110 may implement an error correction scheme to detect, identify, and correct such errors. For example, before storing a set of data, the memory device 110 may use an error correction code to generate a codeword—made up of the data bits and corresponding parity bits—that can be used by the memory device 110 to detect errors in the codeword. The parity bits of the codeword may be generated by applying the error correction code to the set of data, which may involve running the set of data through a logic circuit made up of, for example, a series of components, such as XOR logic gates. The memory device 110 may store the set of data and the parity bits (collectively referred to as a "codeword") in memory so that one or more errors in the codeword can be detected during a read operation. For example, the memory device 110 may detect an error in the codeword based on syndrome bits that are generated (e.g., during a decoding process) from the bits of the codeword stored in memory.

The memory device 110 may encounter different types of errors when decoding a codeword. For example, the memory device 110 may detect a data bit error (or "single bit error" (SBE)), which may be an error in a data bit of the codeword. As another example, the memory device 110 may detect a parity bit error, which may be an error in a parity bit of the codeword. As another example, the memory device 110 may detect an address bit error, which, in examples where the error correction code is applied to address bits in addition to data bits, may be an error in an address bit of the codeword. As another example, the memory device 110 may detect a multi-bit error (MBE), which may be in an error in two or more bits of the codeword. A multi-bit error may also be referred to as a phantom error in some examples. Additionally, the memory device 110 may not detect any error at all (e.g., the set of data may be error-free).

Upon detecting an error in a codeword the memory device 110 may correct the error—if the error is correctable—before returning the set of data to a requesting device, such as the host device 105. The memory device 110 may also indicate to the host device 105 that the set of data had or has an error that the memory device 110 detected. However, the memory device 110 may not have a mechanism for indicating to the host device 105 the type of the error detected by the memory device 110, which may impact or impair the performance of the host device 105. For example, the host device 105 may treat the returned data as error-free even though the memory device 110 was unable to correct an error (e.g., a multi-bit error) detected in the data or may not take corrective action that could have been taken had the host device 105 known the type of the error.

According to the techniques described herein, the memory device 110 may transmit to the host device 105 a set of error flags, in the form of bits, that individually or collectively represent one or more types of errors detected during a decoding process for a codeword. The host device 105 may process the data of the codeword or take other actions based on the type of error(s) indicated by the error flags, which may improve system performance. As used herein, a set may include one or more of elements, such that a set of error flags, for example, may include one or more error flags.

Figure 2:
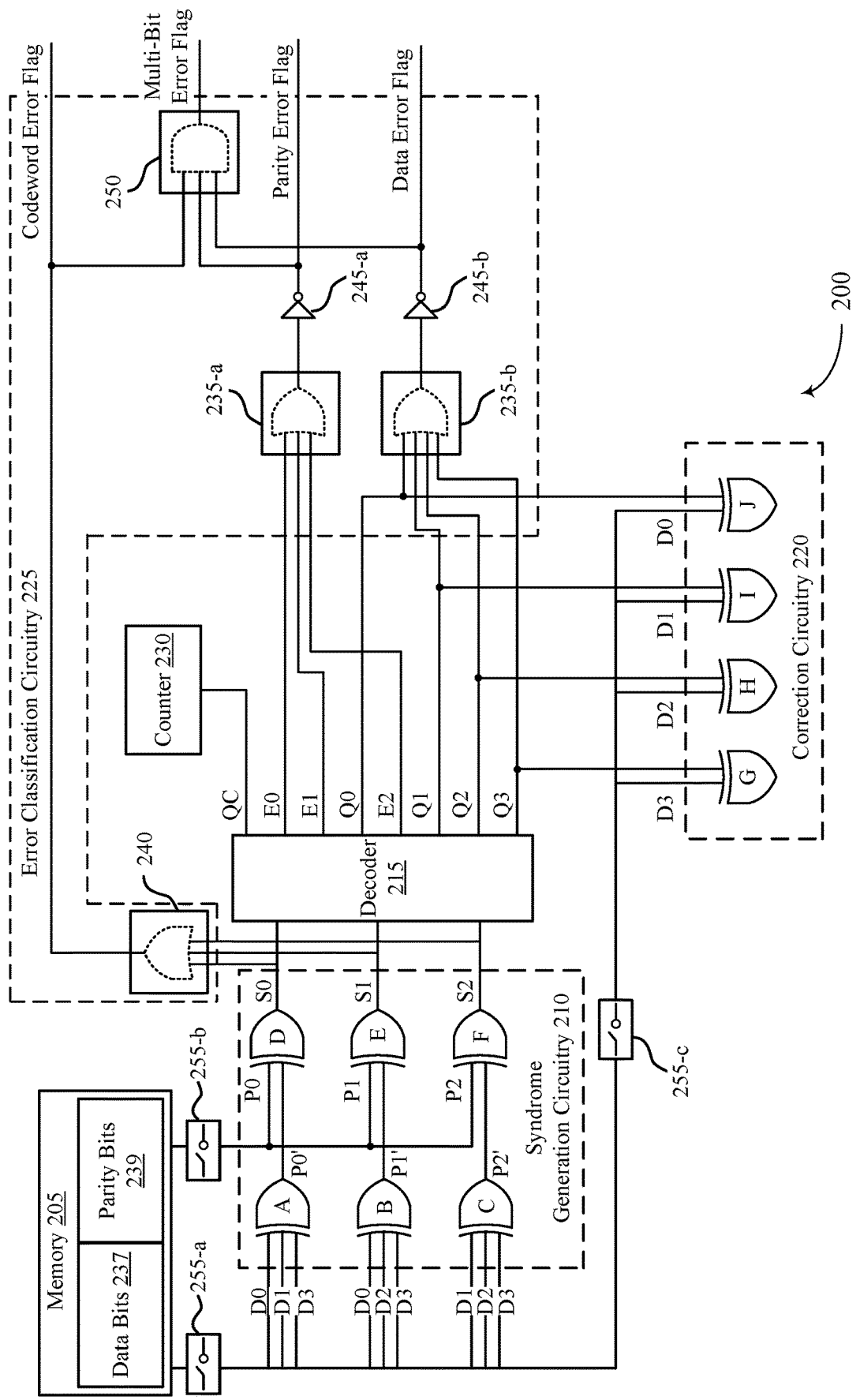
FIG. 2 illustrates an example of a device that supports error type indication in accordance with examples as disclosed herein.

FIG. 2 illustrates an example of a device 200 that supports error type indication in accordance with examples as disclosed herein. The device 200 may include a memory 205 in which the device 200 stores information, such as codewords. The device 200 may also include syndrome generation circuitry 210, decoder 215, correction circuitry 220, error classification circuitry 225, and counter 230. As described herein, the error classification circuitry 225 may output one or more error flags that indicate a type of error detected in a codeword read from the memory 205. The error flag(s) may be output to a host device (or other device) so that the host device can account for the type of error when processing data from the codeword or interacting with the device 200. Compared to the error classification circuitry described with reference to FIGS. 3 and 4, the error classification circuitry 225 may be configured to transmit a respective error flag for each type of error detectable by the decoder 215.

In the illustrated example, the components of device 200 are configured for an error correction code that protects four data bits using three parity bits (of course, the parity bits are also protected by the error correction code). Such an error correction code (ECC) may be denoted ECC (4, 3). However, the techniques described herein are not limited to ECC (4, 3) and can be implemented for different or more complex error correction codes, such as ECC (136, 128), among others. For other error correction codes, a different quantity of logic gates and/or a different quantity of inputs per logic gate may be used without departing from the techniques described herein.

At a high level, the device 200 may store a codeword in the memory 205. When a read command is received for the codeword, the syndrome generation circuitry 210 may generate syndrome bits for the codeword by performing logical operations on the bits of the codeword read from the memory 205. The decoder 215 may use the syndrome bits to detect one or more errors in the codeword (assuming that the codeword has one or more errors, which may not be the case). The decoder 215 may output one or more error indication bits that may cause the correction circuitry 220 to correct an error in the data bits of the codeword before the data bits are returned to the host device. The decoder 215 may also drive various components of the error classification circuitry 225, which may output error flags that indicate the type of error detected by the decoder 215 (or, if no error is detected, that indicate no error). Additional details regarding the functionality of the various components of device 300 are described herein.

As noted, the error classification circuitry 225 may output error flags that may each represent a respective type of error. For example, the error classification circuitry 225 may output a codeword error flag that indicates an error in the codeword, a multi-bit error flag that indicates a multi-bit error, a parity error flag that indicates a parity bit error, and a data bit error flag that indicates a data bit error. Each of the error flags may be associated with the same codeword and may be transmitted over respective conductive lines. The transmission of the error flags may overlap at least partially in time with transmission of the corresponding data from correction circuitry 220 or may occur before or after the transmission of the data. Additionally, the error flags may be transmitted in parallel (e.g., during overlapping time periods) or serially (e.g., at different times). An error flag may also be referred to as a bit, signal, indication, or other suitable terminology.

The error classification circuitry 225 may generate the codeword error flag by performing one or more OR operations on the syndrome bits for a codeword. For example, logic gate 240 (e.g., an OR gate) may perform an OR operation on the syndrome bits (denoted S0, S1, and S2) for a codeword decoded by decoder 215. Logic gate 240 may output a logic zero when the syndrome bits are all logic zeros (which occurs when the codeword is error-free) and may output a logic one when one or more of the syndrome bits is a logic one (which occurs when the codeword has an error). So, logic gate 240 may output a logic zero when the codeword is error-free and logic gate 240 may output a logic one when the codeword has an error. Accordingly, the host device may determine whether an error was detected for a codeword based at least in part on the logic value of the codeword error flag. The codeword error flag may be generated using a single logic gate (as shown) or a combination of logic gates.

The error classification circuitry 225 may generate the parity error flag by performing one or more OR operations on the parity error indication bits for the codeword (e.g., bits that indicate which parity bit in the codeword, if any, has an error) and inverting the resulting signal. For example, logic gate 235-a (e.g., an OR gate) may perform an OR operation on the parity error indication bits (e.g., denoted E1, E2, E3) for the parity bits of a codeword decoded by decoder 215. And inverter 245-a may invert the signal that results from the OR operation. Logic gate 235-a may output a logic zero when the parity error indication bits are all zero (which occurs when the parity bits are error-free) and may output a logic one when one or more of the parity error indication bits is a logic one (which occurs when the parity bits have an error). Thus, inverter 245-a may output a logic one when the parity bits are error free and inverter 245-a may output a logic zero when the parity bits have an error.

The error classification circuitry 225 may generate the data error flag by performing one or more OR operations on the data error indication bits for the codeword (e.g., bits that indicate which data bit in the codeword, if any, has an error) and inverting the resulting signal. For example, logic gate 235-b (e.g., an OR gate) may perform an OR operation on the data error indication bits (e.g., denoted Q1 through Q3) for the data bits of a codeword undergoing a decoding process by decoder 215. And inverter 245-b may invert the signal that results from the OR operation. Logic gate 235-b may output a logic zero when the data error indication bits are all zero (which occurs when the data bits are error-free) and may output a logic one when one or more of the data error indication bits is a logic one (which occurs when the data bits have an error). Thus, inverter 245-b may output a logic one when the data bits are error free and inverter 345-*a* may output a logic zero when the data bits have an error.

Although described, respectively, with reference to a single OR operation performed by a single OR gate and a single inversion operation performed by a single inverter, the parity error flag and the data error flag may be generated using multiple OR operations performed by multiple OR gates, or using multiple inversion operations performed by multiple inverters, or some combination thereof.

When the decoder 215 is configured to detect single bit errors (as opposed to multi-bit errors) and the codeword has multiple errors, the device 200 may not be able to correct the errors. Further, in such circumstances the codeword error flag may conflict with parity error flag and the data error flag. For example, the codeword error flag may indicate an error in the codeword but the parity error flag and the data error flag may indicate that the codeword is error-free (or vice versa). Such a phenomenon may occur when the syndrome bits indicate an error, but the location of the error indicated by the syndrome bits does not exist (e.g., the syndrome bits may indicate the tenth data bit in a codeword even though the codeword has fewer than ten data bits). If a multi-bit error results in conflicting error flags, for example, the host device may erroneously determine that the codeword is error-free, which may negatively impact system performance. So detection and indication of a multi-bit error may be desirable.

The error classification circuitry 225 may generate the multi-bit error flag by performing one or more AND operations on the codeword error flag, the parity error flag, and the data bit error flag. For example, logic gate 250 (e.g., an AND gate) may perform an AND operation on the codeword error flag output by logic gate 240, the parity error flag output by inverter 245-*a*, and the data error flag output by inverter 245-*b*. Logic gate 250 may output a logic zero when no errors are detected in the codeword, parity bits, or data bits (e.g., the multi-bit error flag may be a logic zero when a codeword does not have a multi-bit error). Logic gate 250 may output a logic one when there is an error in the codeword but not the parity bits or the data bits; or when there is an error in the parity bits and data bits but not the codeword (e.g., the multi-bit error flag may be a logic one when a codeword has a multi-bit error). Although described with reference to a single AND operation performed by a single AND gate, the multi-bit error flag may be generated using multiple AND operations performed by multiple AND gates.

The syndrome generation circuitry 210 may generate syndrome bits (denoted S0, 1, and S2) for a codeword stored in the memory 205. The syndrome bits may allow the decoder 215 to detect errors in the codeword. As noted, a codeword may be made up of data bits and parity bits that are protected by an error correction code. For example, a codeword may include data bits 237—which may include data bit 0 (D0), data bit 1 (D1), data bit 2 (D2), and data bit 3 (D30)—and parity bits 239, which may include parity bit 0 (P0), parity bit 1 (P1), and parity bit 2 (P2). Thus, the syndrome generation circuitry 210 may generate syndrome bits (e.g., S0, S1, S2) based on data bits D0 through D3, which may be included in the data bits 237. Additionally, the syndrome generation circuitry 210 may generate syndrome bits (e.g., S0, S1, S2) based on parity bits 0 through P2.

The syndrome generation circuitry 210 may generate syndrome bits by performing logical operations on the bits in a codeword. For example, XOR gate A, XOR gate B, and XOR gate C may perform a logical XOR operation on data bits D0 through D2 as illustrated. The bits output by XOR gates A, B, C may represent versions of parity bits (e.g., P0, P1, P2) that are based on the data bits read from memory, and thus are denoted P0', P1', and P2'. To finish generating the syndrome bits (e.g., S0, S1, S2), the syndrome generation circuitry 210 may perform XOR operations on the stored parity bits (e.g., P0, P1, P2) and the generated parity bits (e.g., P0', P1', P2'). For example, XOR gate D may generate syndrome bit S0 by performing a logical XOR operation on P0 and P0'. A similar analysis applies to XOR gate E and XOR gate F. Thus, the syndrome generation circuitry 210 may generate syndrome bits for a codeword stored in the memory 205.

The decoder 215 may decode the syndrome bits of the codeword to detect errors in the codeword. For example, the decoder 215 may decode syndrome bits S0, S1, and S2 to detect an error in the codeword read from the memory 205. In some examples, the decoder 215 may detect that a codeword is error-free if the syndrome bits (e.g., S0, S1, S2) are all logic zeros. If one or more of the syndrome bits is a logic one, the decoder 215 may detect an error and determine the location of the error based on the value of the syndrome bits. Thus, the decoder 215 may perform a decoding process on a codeword to determine not only which bits, if any, have an error, but also the location of those bits.

Upon completion of a decoding process for a codeword, the decoder 215 may output error indication bits that indicate which bit in the codeword has an error. The error indication bits may cause the correction circuitry 220 to correct errors in the codeword and may drive various components of the error classification circuitry 225. The decoder 215 may output an error indication bit for each bit in the codeword, and the logic value of an error indication bit may indicate the error status of that bit. Thus, the decoder 215 may output an error indication bit for each of the parity bits P0, P1, and P2; and the decoder 215 may output an error indication bit for each of the data bits D0, D1, D2, and D3. The error indication bit for a parity bit x may be referred to as a parity error indication bit and may be denoted Ex. The error indication bit for a data bit y may be referred to as a data error indication bit and may be denoted Qy.

In addition to outputting one or more error indication bits for each bit in a codeword, the decoder 215 may output an error indication bit, denoted QC, that indicates whether the codeword has an error. The error indication bit for the codeword may be referred to as a codeword error indication bit and may be transmitted to the counter 230 so that the device 200 can monitor the reliability of the device 200.

The correction circuitry 220 may correct errors in the data bits of codewords before the data bits are transmitted to the host device. The correction circuitry 220 may correct an error in a data bit by performing a XOR operation on the data bit and the data error indication flag for that data bit (because such an XOR operation will invert the data bit if the data error indication bit is a logic '1,' which represents an error). For example, when data bit D0 has an error, XOR gate J may correct data bit D0 by performing an XOR operation on data bit D0 and the error indication bit Q0. A similar analysis applies to XOR gate G, XOR gate H, and XOR gate I. Thus, the error indication bits may drive the correction of erroneous data bits in a codeword in addition to driving various components of the error classification circuitry 225.

Device 200 may include one or more switches, such as switches 255, which may selectively couple different conductive paths when appropriately activated. For example, switch 255-*a* may selectively couple the memory 205 to different conductive paths coupled with the inputs of the XOR gates A, B, and C so that the appropriate data bits are loaded into the XOR gates A, B, and C. Similarly, switch 255-*b* may selectively couple the memory 205 to different conductive paths coupled with the inputs of the XOR gates D, E, and F so that the appropriate parity bits are loaded into the XOR gates D, E, and F. And switch 255-*c* may selectively couple the memory 205 to different conductive paths coupled with the inputs of the OR gates G through J so that the appropriate data bits are loaded into the OR gates G through J.

Although described with reference to example logic gates in an example configuration, the error classification circuitry 325 may be composed of other types of logic gates (e.g., AND gates, NAND gates, OR gates, NOR, XOR gates, and NOT gates) in different configurations that may provide the functionality of or similar to the logic gates described herein. Additionally, the logical operations described as being performed by some quantities of logic gates may be performed using different quantities of logic gates in some examples.

Figure 3:
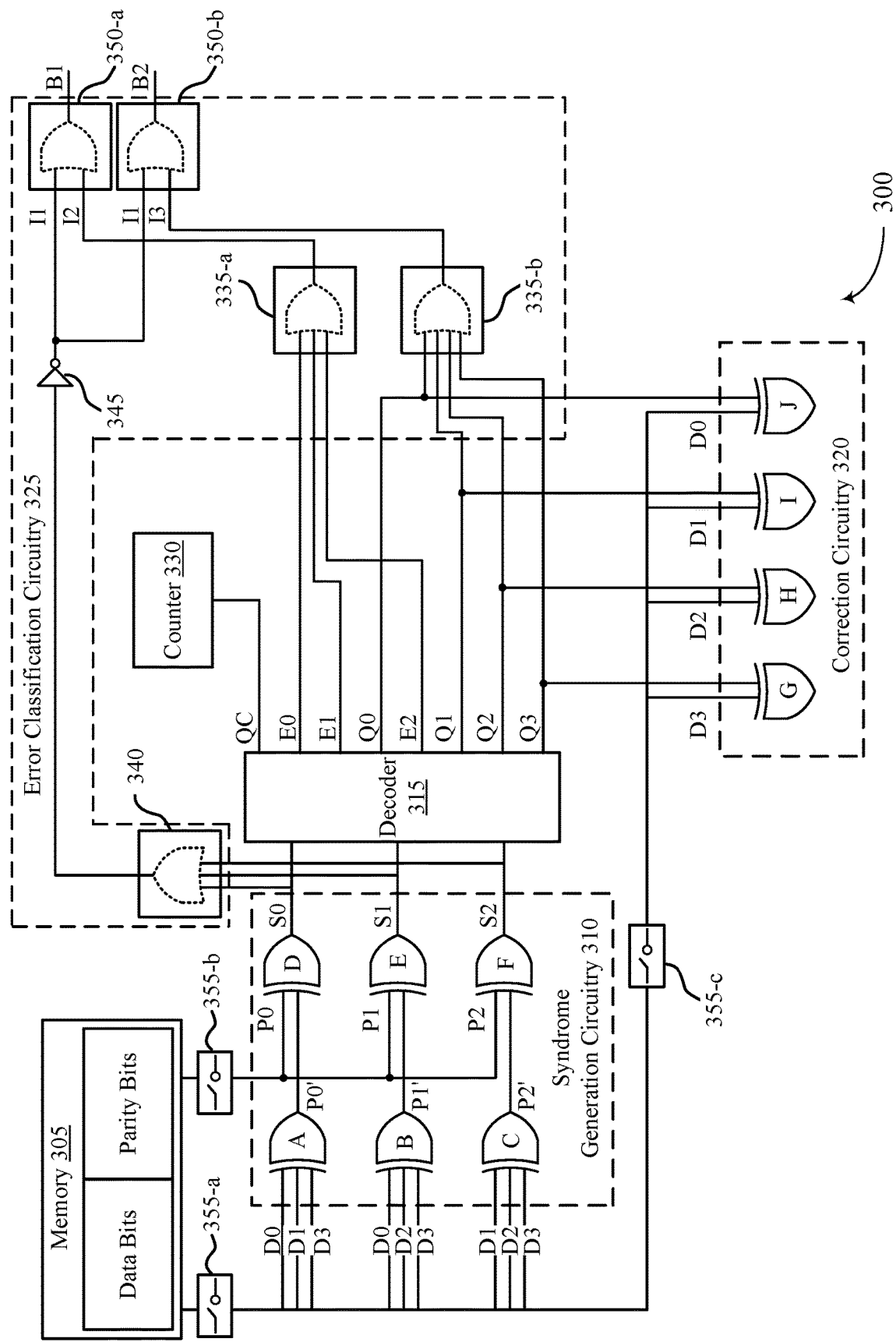
FIG. 3 illustrates an example of a device that supports error type indication in accordance with examples as disclosed herein.

FIG. 3 illustrates an example of a device 300 that supports error type indication in accordance with examples as disclosed herein. The device 300 may include a memory 305 in which the device 300 stores information, such as codewords. The device 300 may also include syndrome generation circuitry 310, decoder 315, correction circuitry 320, and counter 330, which may function as the corresponding components described with reference to FIG. 2. Further, the device 300 may include error classification circuitry 325, which may output one or more error flags that indicate a type of error detected in a codeword read from the memory 305. The error flag(s) may be output to a host device (or other device) so that the host device can account for the type of error when processing data from the codeword or interacting with the device 300. The switches 355 (e.g., switch 355-*a*, switch 355-*b*, and switch 355-*c*) may operate similar to the switches 255 as described with reference to FIG. 2.

Compared to the error classification circuitry 225, the error classification circuitry 325 may be configured to transmit a set of (e.g., one or more) error flags that collectively indicate a type of error detected by the decoder 315 (e.g., the error classification circuitry 325 may encode the error type indication so that the quantity of bits used to convey the error type indication is reduced relative to quantity output by the error classification circuitry 225). For the purposes of FIG. 3 the error flags may be referred to as error bits.

The error classification circuitry 325 may output a first error bit (B1) and a second error bit (B2) that collectively indicate the type of error detected in a codeword. Each combination of logic values for the error bits may be mapped to a respective type of error as shown in Table 1. For example, a multi-bit error may be indicated when both error bit B1 and error bit 2 are logic zeros. A data bit error may be indicated when error bit B1 is a logic zero and error bit B2 is a logic one. A parity bit error may be indicated when error bit B1 is a logic one and error bit B2 is a logic zero. And no error may be indicated when both error bit B1 and error bit B2 are logic ones. The error bits may be generated by the components of the error classification circuitry 325.

TABLE 1

| Error Type | B1 | B2 |
|---|---|---|
| Multi-bit error | 0 | 0 |
| Data bit error | 0 | 1 |
| Parity bit error | 1 | 0 |
| No error | 1 | 1 |

The first error bit B1 may be generated by performing an OR operation on a signal output by inverter 345 and a signal output by logic gate 335-*a*, which may be an example of logic gate 235-*a* (e.g., an OR gate) described with reference to FIG. 2. For example, logic gate 350-*a* (e.g., an OR gate) may perform an OR operation on signal I1, which may be output from inverter 345, and signal I2, which may be output from logic gate 335-*a*. The signal inverted by inverter 345 may be received from logic gate 340. The signal I1 may be a logic zero when the codeword has an error and may be a logic one when the codeword is error-free. Further, the signal I2 may be a logic zero when the parity bits are error-free and may be a logic one when the parity bits have an error. Thus, error bit B1 may be a logic zero when the syndrome bits indicate a codeword error but the parity error indication bits indicate no error (which may occur when there is a multi-bit error or when there is a data bit error).

The second error bit B2 may be generated by performing an OR operation on a signal output by inverter 345 and a signal output by logic gate 335-*b*, which may be an example of logic gate 235-*b* described with reference to FIG. 2. For example, logic gate 350-*b* (e.g., an OR gate) may perform an OR operation on signal I1, which may be output from inverter 345, and signal I3, which may be output from logic gate 335-*b* (e.g., an OR gate). As noted, the signal I1 may be a logic zero when the codeword has an error and may be a logic one when the codeword is error-free. Further, the signal I3 may be a logic zero when the data bits are error-free and may be a logic one when the data bits have an error. Thus, error bit B2 may be a logic zero when the syndrome bits indicate a codeword error but the data error indication bits indicate no error (which may occur when there is a multi-bit error or when there is a parity bit error).

Broadening language and disclaimers described with reference to the device 200 may also similarly apply to the aspects described with respect to device 300. For example, although described with reference to one or more operations performed by a one or more gates or components, the one or more error flags may be generated using any quantity of operations performed by any quantity of gates, or using any quantity of operations performed by any quantity of various components. Various aspects of device 300 may be incorporated into device 200, and device 400, and vice versa.

Figure 4:
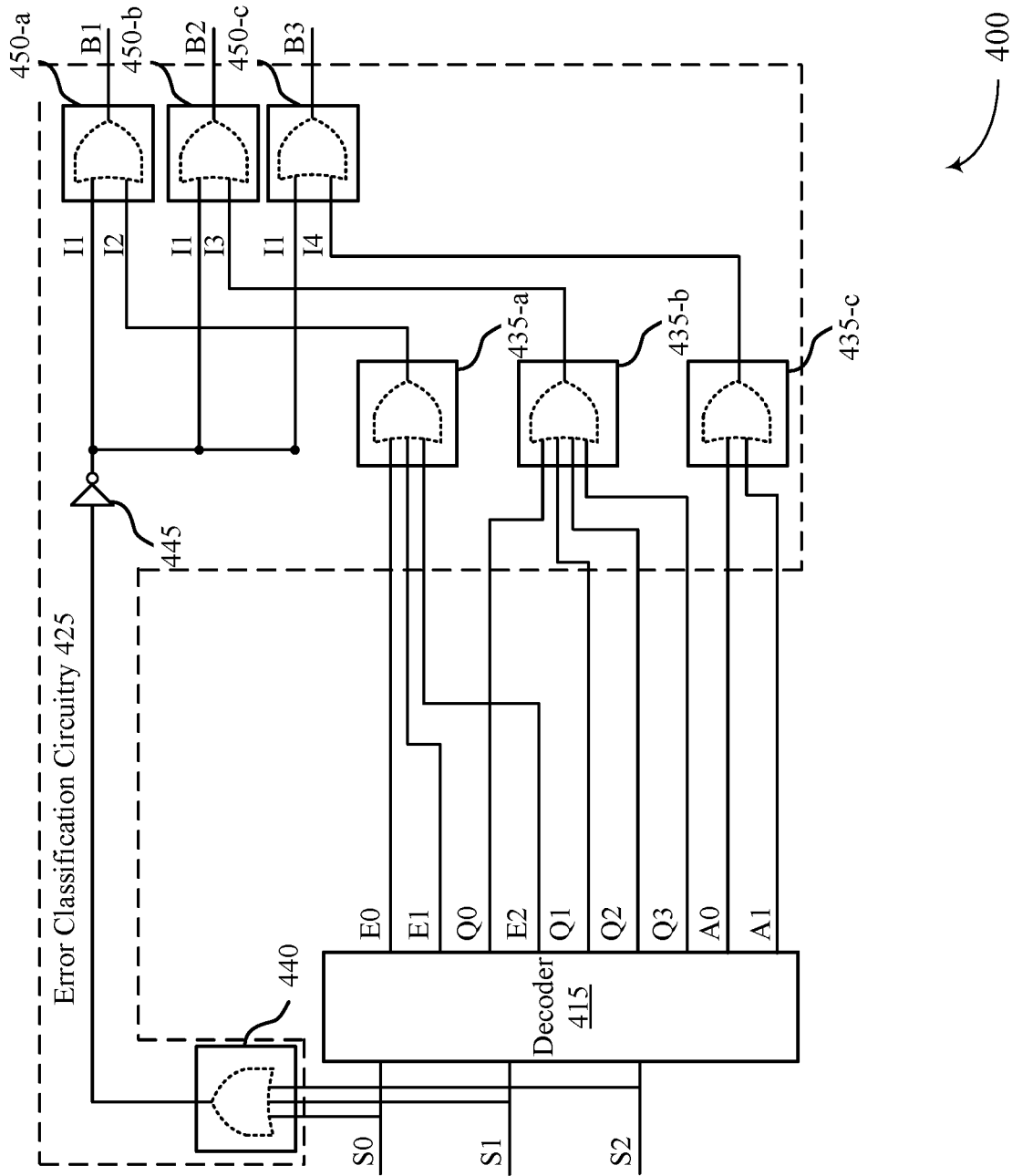
FIG. 4 illustrates an example of a device that supports error type indication in accordance with examples as disclosed herein.

FIG. 4 illustrates an example of a device 400 that supports error type indication in accordance with examples as disclosed herein. Although omitted in FIG. 4 for ease of illustration, the device 400 may include a memory, syndrome generation circuitry, a counter, and error correction circuitry as described with reference to FIG. 2. The device 400 may also decoder 415 and error classification circuitry 425. The error classification circuitry 425 may be similar to the error classification circuitry 325 but may be configured to output an additional error flag that allows the device 400 to indicate an address bit error in addition to the other types of errors described herein. For the purposes of FIG. 4 the error flags may be referred to as error bits.

In some examples, a codeword may include address bits as well as data bits and parity bits. For example, a codeword may include one or more bits that represent the address to which a set of data is written. Such a codeword may be generated by applying an error correction code to the address bits in addition to the set of data (e.g., the address bits may be seeded into the ECC) so that the parity bits protect the address bits as well as the set of data. Including address bits in a codeword may allow the device 400 to detect when the incorrect address has been written or read.

As an example, consider a scenario in which the device 400 receives a set of data for storage in memory. After receiving the set of data, the device 400 may generate a codeword based on the data bits and one or more address bits that correspond to an address to which the data will be written. However, rather than storing the entire codeword in memory, the device 400 may store only the data bits and the parity bits of the codeword (e.g., the device 400 may exclude the address bits from storage). When the device 400 receives a read command for the set of data, the device 400 may generate (in process a similar to that described with reference to FIG. 2) the syndrome bits based on the data bits stored in the memory, the parity bits stored in the memory, and one or more address bits that correspond to the address read by the device 400. The decoder 415 may then perform a decoding process on the syndrome bits for the codeword to detect any errors in the codeword. An error in the address bits may indicate that the device 400 read from the wrong address (e.g., the device 400 wrote and read from different memory addresses). If the decoder 415 detects an error in the address bits, the decoder 415 may output an address error indication flag (denoted Ax for address bit x) that indicates which address bit contains the error. Thus, the address error indication bits may be used to detect an inconsistency between a write address and a read addresses, which may be referred to as an address error.

The error classification circuitry 425 may be configured to indicate an address error. For example, the error classification circuitry 425 may output a first error bit (B1), second error bit (B2), and a third error bit (B3) that collectively indicate the type of error detected in a codeword. Each combination of logic values for the error bits may be mapped to a respective type of error as shown in Table 2. For example, a multi-bit error may be indicated when all of the error bits are logic zeros. An address bit error may be indicated when error bits B1 and B2 are logic zeros and error bit B3 is a logic 1. A data bit error may be indicated when error bits B1 and B3 are logic zeros and error bit B2 is a logic 1. A parity bit error may be indicated when error bit B1 is a logic one and error bits B2 and B3 are logic zeros. And no error may be indicated when all of the error bits are logic ones. The error bits may be generated by the components of the error classification circuitry 325.

TABLE 2

| Error Type | B1 | B2 | B3 |
|---|---|---|---|
| Multi-bit error | 0 | 0 | 0 |
| Address bit error | 0 | 0 | 1 |
| Data bit error | 0 | 1 | 0 |
| Parity bit error | 1 | 0 | 0 |
| No error | 1 | 1 | 1 |

The first error bit B1 and the second error bit B2 may be generated as described with reference to FIG. 3. Thus, logic gate 435-a, logic gate 435-b, logic gate 440, inverter 445, logic gate 450-a, and logic gate 450-b may function similar to corresponding components as described with reference to FIG. 3.

The third error bit B3 may be generated by performing an OR operation on a signal output by inverter 445 and a signal output by logic gate 435-c (which may perform an OR operation on the address error indication bits (A0, A1) for a codeword). For example, logic gate 450-c may perform an OR operation on signal I1, which may be output from inverter 445, and signal I4, which may be output from logic gate 435-c (e.g., an OR gate). As noted, the signal I1 may be a logic zero when the codeword has an error and may be a logic one when the codeword is error-free. Further, the signal I4 may be a logic zero when the address bits are error-free and may be a logic one when the address bits have an error. Thus, error bit B3 may be a logic zero when the syndrome bits indicate a codeword error but the address error indication bits indicate no error (which may occur when there is a multi-bit error, a parity bit error, or a data bit error).

Various aspects of device 400 may be incorporated into device 200, and device 300, and vice versa. For example, logic gate 435-c may be added to the error classification circuitry 225 so that device 200 outputs an address bit error flag that indicates an address bit error in a codeword. In such an example, logic gate 435-c may output a logic zero when the address bits are error-free and may output a logic one when the address bits have an error. Although described, respectively, with reference to a single OR operation performed by a single OR gate, the address error flag may be generated using multiple OR operations performed by multiple OR gates.

Broadening language and disclaimers described with reference to the device 200 may also apply to the device 400. For example, although described with reference to one or more operations performed by a one or more gates or components, the one or more error flags may be generated using any quantity of operations performed by any quantity of gates or using any quantity of operations performed by any quantity of various components.

Figure 5:
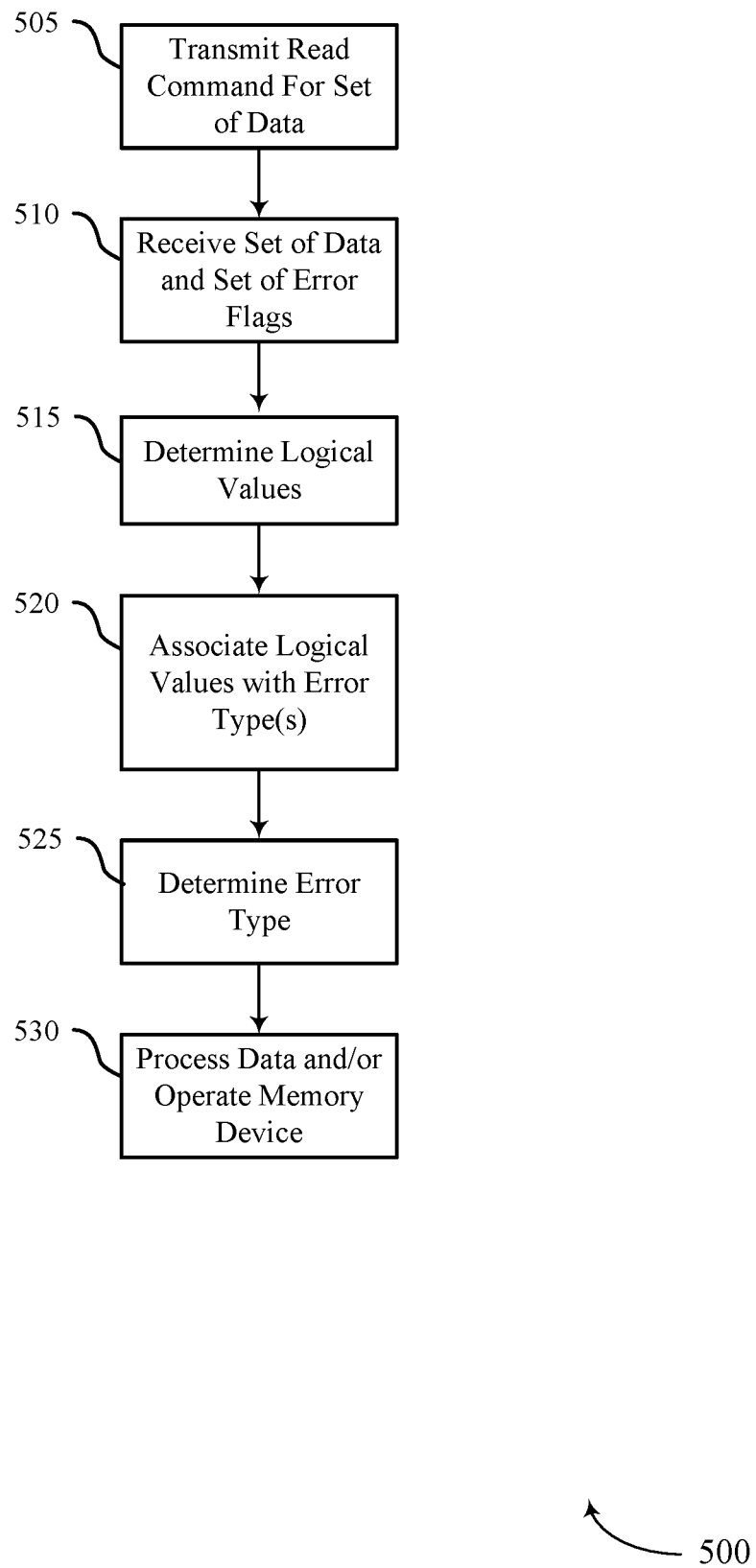
FIG. 5 illustrates an example of a processor flow that supports error type indication in accordance with examples as disclosed herein.

FIG. 5 illustrates an example of a process flow 500 that supports error type indication in accordance with examples as disclosed herein. Process flow 500 may be implemented by a host device 105, in some examples, as described with reference to FIG. 1. However, other types of devices may implement process flow 500. The process flow 500 may illustrate the operations of a device that receives the error flags described herein and uses the error flags to determine a type of error detected in a codeword.

For ease of reference, the process flow 500 is described with reference to a host device. For example, aspects of the process flow 500 may be implemented by a host device that is coupled with a memory device. Additionally or alternatively, aspects of the process flow 500 may be implemented by a controller, for example a controller of a host device or a memory device, among other components. Additionally or alternatively, aspects of the process flow 500 may be implemented as instructions stored in memory (e.g., firmware stored in the memory device 110). For example, the instructions, when executed by a controller (e.g., a processor 125 or an external memory controller 120), may cause the controller to perform the operations of the process flow 500.

At 505, a read command for a set of data may be transmitted. For example, the host device may transmit to a memory device a read command for a set of data. As used herein, the term "set" may refer to one or more elements in the set.

At 510, the host device may receive from the memory device the set of data and a set of error flags. The set of data and the set of error flags may be received based at least in part on transmission of the read command. The set of data may be received before the set of error flags, after the set of error flags, or concurrently with the set of error flags (e.g., receipt of the set of data may overlap at least partially in time with receipt of the set of error flags). The set of error flags may be received serially (e.g., at different times) or partially or completely in parallel (e.g., multiple flags may be received at the same time). In some examples, the set of error flags includes error flags that are received over different pins and/or conductive paths. In some examples, the set of error flags includes error flags that are received at different times over the same conductive path (e.g., the error flags may be time division multiplexed).

At 515, the logical values of the error flags may be determined using various examples of circuitry or other components.

At 520, the logical values of the error flags may be associated or mapped to one or more error types. For example, if the error correction circuitry of the memory device is configured as illustrated in FIG. 2, the host device may associate each error flag with a respective error type as described with reference to FIG. 2. If the error correction circuitry of the memory device is configured as illustrated in FIG. 3 or FIG. 4, the host device may associate the collective set of logical values with a particular type of error as described with reference to FIG. 3 and FIG. 4.

At 525, the error type for the codeword may be determined based at least in part on the logical values of the set of error flags and the determined association(s). For example, the host device may determine that a codeword error, a multi-bit error, a parity error, a data error, an address bit error, or no error was detected in the codeword.

At 530, the data may be processed and/or the memory device may be operated based at least in part on the error type. For example, the host device may discard the set of data if a multi-bit error is indicated by the set of error flags (e.g., because the codeword has at least two errors that the memory device was unable to correct). As another example, the host device may transmit a second read command for the set of data if an address error is indicated (e.g., because the memory device returned the wrong set of data). As another example, the host device may (e.g., if a threshold quantity of errors have been detected in a threshold amount of time) instruct the memory device to perform one or more procedures that improve the reliability of the memory device. Thus, the host device may make one or more operating decisions based on the type of error detected for the codeword, which may improve system performance, among other benefits.

Figure 6:
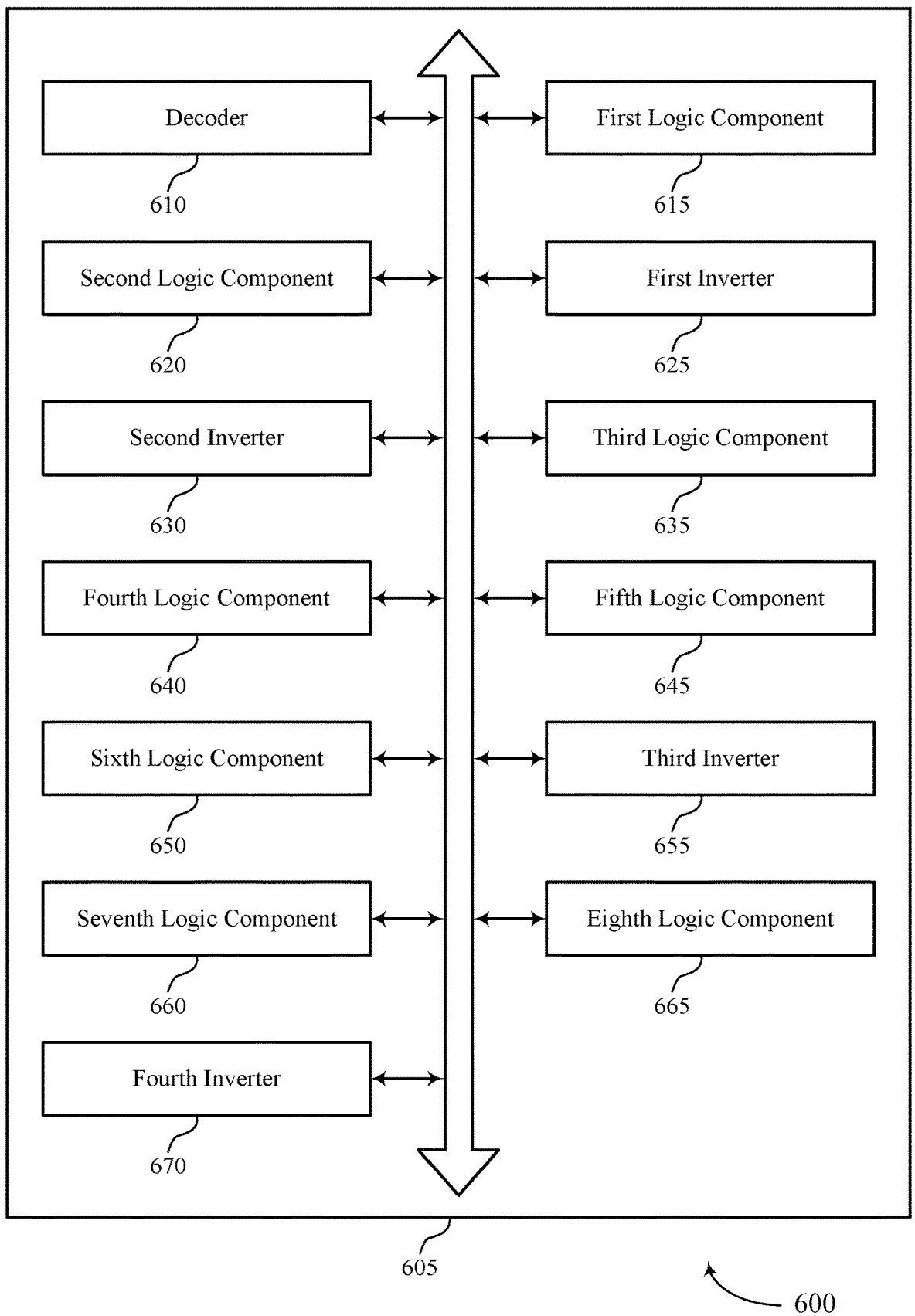
FIG. 6 shows a block diagram of a memory device that supports error type indication in accordance with aspects of the present disclosure.

FIG. 6 shows a block diagram 600 of a memory device 605 that supports error type indication in accordance with examples as disclosed herein. The memory device 605 may be an example of aspects of a device as described with reference to FIGS. 2 through 4. The memory device 605 may include a decoder 610, a first logic component 615, a second logic component 620, a first inverter 625, a second inverter 630, a third logic component 635, a fourth logic component 640, a fifth logic component 645, a sixth logic component 650, a third inverter 655, a seventh logic component 660, an eighth logic component 665, and a fourth inverter 670. Each of these modules may communicate, directly or indirectly, with one another (e.g., via one or more buses).

The decoder 610 may perform, by a decoder, an error detection procedure for a codeword protected by an error correction code.

In some examples, the decoder 610 may output, based on the error detection procedure, a first set of bits that represent error flags for a set of parity bits included in the codeword and second set of bits that represent error flags for a set of data bits included in the codeword. The first logic component 615 may perform a first logical OR operation on the first set of bits that represent error flags for the set of parity bits included in the codeword. The first logic component 615 may be one or more logic OR gates or circuitry configured to function as one or more logic OR gates. The second logic component 620 may perform a second logical OR operation on the second set of bits that represent error flags for the set of data bits included in the codeword. The second logic component 620 may be one or more logic OR gates or circuitry configured to function as one or more logic OR gates The first inverter 625 may invert a first signal that is based on the first logical OR operation. The second inverter 630 may invert a second signal that is based on the second logical OR operation.

The third logic component 635 may perform a logical AND operation on the inverted first signal and the inverted second signal. The third logic component 635 may be one or more logic AND gates or circuitry configured to function as one or more logic AND gates. The fourth logic component 640 may perform a third logical OR operation on a set of syndrome bits for the codeword, where the logical AND operation is performed on a third signal that is based on the third logical OR operation. The fourth logic component 640 may be one or more logic OR gates or circuitry configured to function as one or more logic OR gates.

In some examples, the fourth logic component 640 may perform a fifth logical OR operation on a set of syndrome bits for the codeword. In some examples, the fourth logic component 640 may perform a seventh logical OR operation on a set of syndrome bits for the codeword.

The fifth logic component 645 may perform a third logical OR operation on a first signal that is based on the first logical OR operation. The fifth logic component 645 may be one or more logic OR gates or circuitry configured to function as one or more logic OR gates. In some examples, the fifth logic component 645 may perform a fourth logical OR operation on a first signal that is based on the first logical OR operation.

The sixth logic component 650 may perform a fourth logical OR operation on a second signal that is based on the second logical OR operation. The sixth logic component 650 may be one or more logic OR gates or circuitry configured to function as one or more logic OR gates. In some examples, the sixth logic component 650 may perform a fifth logical OR operation on a second signal that is based on the second logical OR operation.

The third inverter 655 may invert a third signal that is based on the fifth logical OR operation, where the third logical OR operation is performed on the inverted third signal and the fourth logical OR operation is performed on the inverted third signal.

The seventh logic component 660 may perform a third logical OR operation on the third set of bits that represent error flags for the set of address bits included in the codeword. The seventh logic component 660 may be one or more logic OR gates or circuitry configured to function as one or more logic OR gates. The eighth logic component 665 may perform a sixth logical OR operation on a third signal that is based on the third logical OR operation. The eighth logic component 665 may be one or more logic OR gates or circuitry configured to function as one or more logic OR gates.

The fourth inverter 670 may invert a fourth signal that is based on the seventh logical OR operation, where the fourth logical OR operation, the fifth logical OR operation, and the sixth logical OR operation are performed on the inverted fourth signal.

Figure 7:
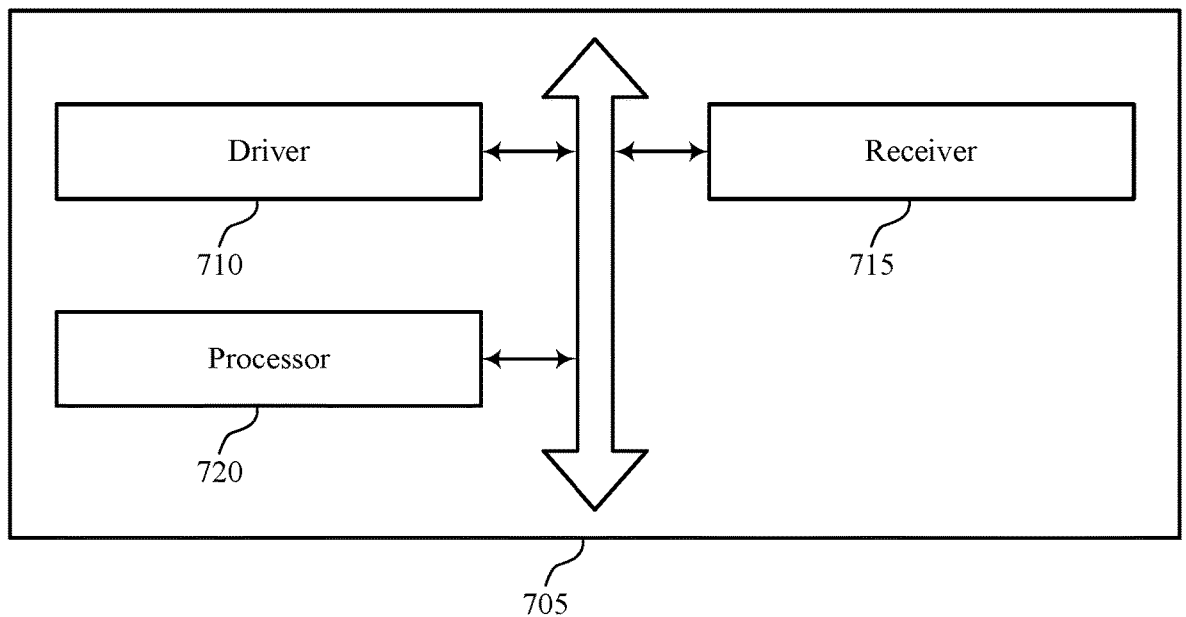
FIG. 7 shows a block diagram of a host device that supports error type indication in accordance with aspects of the present disclosure.

FIG. 7 shows a block diagram 700 of a host device 705 that supports error type indication in accordance with examples as disclosed herein. The host device 705 may be an example of aspects of a host device as described with reference to FIG. 1. The host device 705 may include a driver 710, a receiver 715, and a processor 720. Each of these modules may communicate, directly or indirectly, with one another (e.g., via one or more buses).

The driver 710 may transmit to a memory device a read command for a set of data. The driver 710 may be or include a transmitter, transceiver, or circuit configured to function as a transmitter or transceiver. The receiver 715 may receive the set of data from the memory device based on transmitting the read command. The receiver 715 may be or include a transceiver, data bus interface, or circuitry configured to function as a transceiver or data bus interface. In some examples, the receiver 715 may receive, from the memory device, a set of bits that is associated with the set of data and that indicates a type of error detected during a during an error detection procedure for the set of data, the type of error including a data bit error, a parity bit error, or a multi-bit error.

In some cases, the host device 705 is configured to receive the set of bits at least partially overlapping in time with receiving the set of data. In some cases, the host device 705 is configured to receive the set of bits over different conductive lines. In some cases, the host device 705 is configured to receive the set of bits at different times over a same conductive line.

The processor 720 may determine the type of error detected during the error detection procedure based on respective logical values of the first bit, the second bit, and the third bit. In some examples, the processor 720 may process the set of data based on the determined type of error.

In some examples, the processor 720 may determine that the set of bits has a set of logical values associated with the type of error. In some examples, the processor 720 may determine the type of error detected during the error detection procedure based on the set of logical values being associated with the type of error. In some examples, the processor 720 may process the set of data based on the determined type of error.

In some examples, the processor 720 may determine a first logical value of the first bit and a second logical value of the second bit. In some examples, the processor 720 may determine the type of error detected during the error detection procedure based on the type of error being associated with the first logical value of the first bit and the second logical value of the second bit. In some examples, the processor 720 may process the set of data based on the determined type of error.

In some examples, the processor 720 may determine a third logical value of the third bit, where the address bit error is determined based on the address bit error being associated with the third logical value of the third bit.

Figure 8:
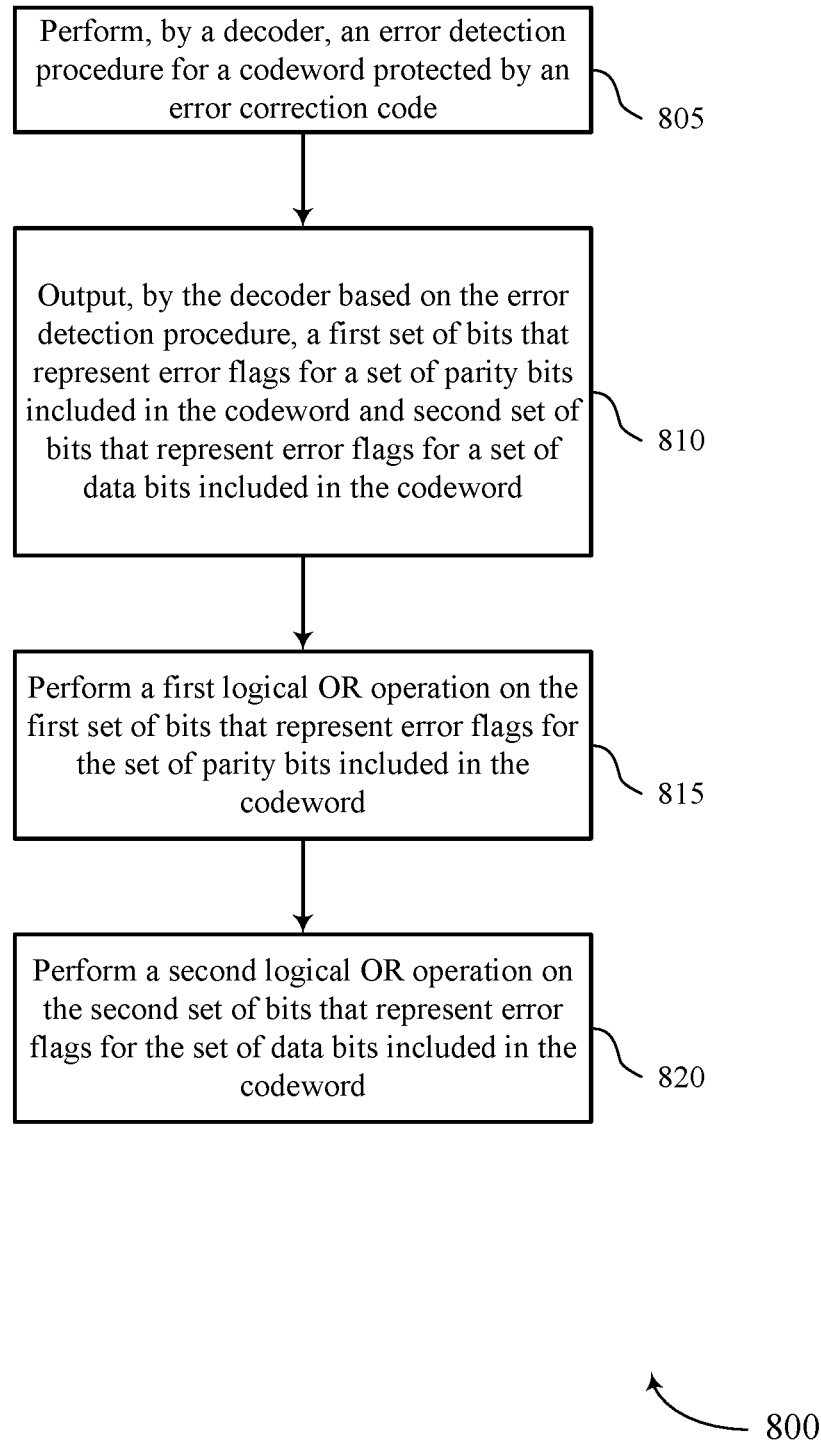
FIGS. 8 and 9 show flowcharts illustrating a method or methods that support error type indication in accordance with examples as disclosed herein.

FIG. 8 shows a flowchart illustrating a method or methods 800 that supports error type indication in accordance with aspects of the present disclosure. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the method may include performing, by a decoder, an error detection procedure for a codeword protected by an error correction code. The operations of 805 may be performed according to the methods described herein. In some examples, aspects of the operations of 805 may be performed by a decoder as described with reference to FIG. 6.

At 810, the method may include outputting, by the decoder based on the error detection procedure, a first set of bits that represent error flags for a set of parity bits included in the codeword and second set of bits that represent error flags for a set of data bits included in the codeword. The operations of 810 may be performed according to the methods described herein. In some examples, aspects of the operations of 810 may be performed by a decoder as described with reference to FIG. 6.

At 815, the method may include performing a first logical OR operation on the first set of bits that represent error flags for the set of parity bits included in the codeword. The operations of 815 may be performed according to the methods described herein. In some examples, aspects of the operations of 815 may be performed by a first logic component as described with reference to FIG. 6.

At 820, the method may include performing a second logical OR operation on the second set of bits that represent error flags for the set of data bits included in the codeword. The operations of 820 may be performed according to the methods described herein. In some examples, aspects of the operations of 820 may be performed by a second logic component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for performing, by a decoder, an error detection procedure for a codeword protected by an error correction code, outputting, by the decoder based on the error detection procedure, a first set of bits that represent error flags for a set of parity bits included in the codeword and second set of bits that represent error flags for a set of data bits included in the codeword, performing a first logical OR operation on the first set of bits that represent error flags for the set of parity bits included in the codeword, and performing a second logical OR operation on the second set of bits that represent error flags for the set of data bits included in the codeword.

Some examples of the method 800 and the apparatus described herein may further include operations, features, means, or instructions for inverting a first signal that may be based on the first logical OR operation, and inverting a second signal that may be based on the second logical OR operation.

Some examples of the method 800 and the apparatus described herein may further include operations, features, means, or instructions for performing a logical AND operation on the inverted first signal and the inverted second signal.

Some examples of the method 800 and the apparatus described herein may further include operations, features, means, or instructions for performing a third logical OR operation on a set of syndrome bits for the codeword, where the logical AND operation may be performed on a third signal that may be based on the third logical OR operation.

Some examples of the method 800 and the apparatus described herein may further include operations, features, means, or instructions for performing a third logical OR operation on a first signal that may be based on the first logical OR operation, and performing a fourth logical OR operation on a second signal that may be based on the second logical OR operation.

Some examples of the method 800 and the apparatus described herein may further include operations, features, means, or instructions for performing a fifth logical OR operation on a set of syndrome bits for the codeword, and inverting a third signal that may be based on the fifth logical OR operation, where the third logical OR operation may be performed on the inverted third signal and the fourth logical OR operation may be performed on the inverted third signal.

Some examples of the method 800 and the apparatus described herein may further include operations, features, means, or instructions for performing a third logical OR operation on the third set of bits that represent error flags for the set of address bits included in the codeword.

Some examples of the method 800 and the apparatus described herein may further include operations, features, means, or instructions for performing a fourth logical OR operation on a first signal that may be based on the first logical OR operation, performing a fifth logical OR operation on a second signal that may be based on the second logical OR operation, and performing a sixth logical OR operation on a third signal that may be based on the third logical OR operation.

Some examples of the method 800 and the apparatus described herein may further include operations, features, means, or instructions for performing a seventh logical OR operation on a set of syndrome bits for the codeword, and inverting a fourth signal that may be based on the seventh logical OR operation, where the fourth logical OR operation, the fifth logical OR operation, and the sixth logical OR operation may be performed on the inverted fourth signal.

In some examples, an apparatus as described herein may perform a method or methods, such as the method 800. The apparatus may include a decoder configured to detect one or more errors in a codeword, a first logic gate coupled with the decoder and configured to perform a first logical OR operation on a first set of bits output from the decoder, the first set of bits representing error flags for a set of parity bits included in the codeword, and a second logic gate coupled with the decoder and configured to perform a second logical OR operation on a second set of bits output from the decoder, the second set of bits representing error flags for a set of data bits included in the codeword.

Some examples of the apparatus may include a first inverter coupled with the first logic gate and configured to invert a signal from the first logic gate that may be based on the first logical OR operation, and a second inverter coupled with the second logic gate and configured to invert a signal from the second logic gate that may be based on the second logical OR operation.

Some examples of the apparatus may include a third logic gate coupled with the first inverter and the second inverter and configured to perform a logical AND operation on a signal from the first inverter and a signal from the second inverter.

Some examples of the apparatus may include a fourth logic gate coupled with the decoder and configured to perform a logical OR operation on a set of syndrome bits for the codeword, where the third logic gate may be configured to perform the logical AND operation on a signal from the fourth logic gate.

Some examples of the apparatus may include a third logic gate configured to perform a third logical OR operation on a signal from the first logic gate that may be based on the first logical OR operation, and a fourth logic gate configured to perform a fourth logical OR operation on a signal from the second logic gate that may be based on the second logical OR operation.

Some examples of the apparatus may include a fifth logic gate coupled with the decoder and configured to perform a logical OR operation on a set of syndrome bits for the codeword, and an inverter coupled with the fifth logic gate and configured to invert a signal from the fifth logic gate, where the third logic gate may be configured to perform the third logical OR operation on a signal from the inverter, and where the fourth logic gate may be configured to perform the fourth logical OR operation on the signal from the inverter.

Some examples of the apparatus may include a third logic gate coupled with the decoder and configured to perform a third logical OR operation on a third set of bits output from the decoder, the third set of bits representing error flags for a set of address bits included in the codeword.

Some examples of the apparatus may include a fourth logic gate coupled with the first logic gate and configured to perform a fourth logical OR operation on a signal from the first logic gate, a fifth logic gate coupled with the second logic gate and configured to perform a fifth logical OR operation on a signal from the second logic gate, and a sixth logic gate coupled with the third logic gate and configured to perform a sixth logical OR operation on a signal from the third logic gate.

Some examples of the apparatus may include a seventh logic gate coupled with the decoder and configured to perform a seventh logical OR operation on a set of syndrome bits for the codeword, and an inverter coupled with the seventh logic gate and configured to invert a signal from the seventh logic gate, where the fourth logic gate may be configured to perform the fourth logical OR operation on a signal from the inverter, the fifth logic gate may be configured to perform the fifth logical OR operation on the signal from the inverter, and the sixth logic gate may be configured to perform the sixth logical OR operation on the signal from the inverter.

Figure 9:
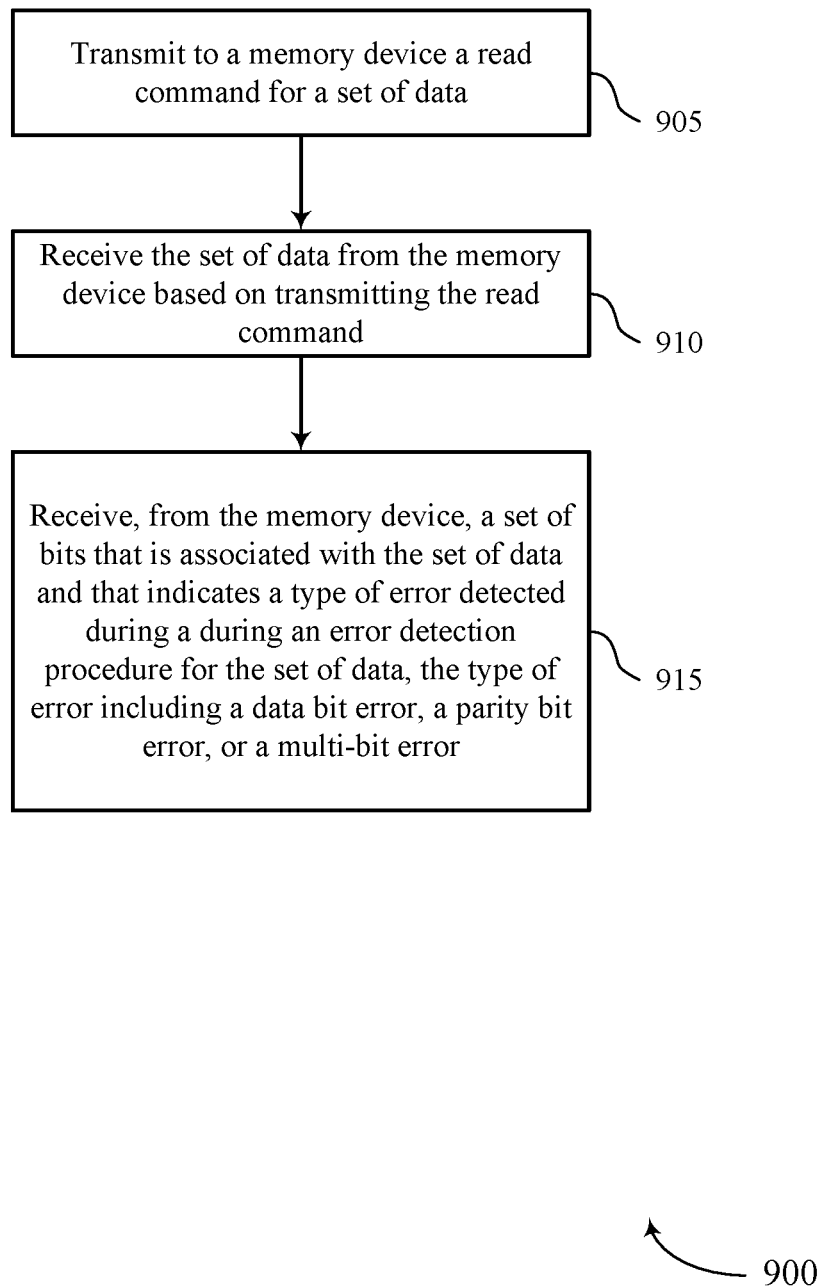

FIG. 9 shows a flowchart illustrating a method or methods 900 that supports error type indication in accordance with aspects of the present disclosure. The operations of method 900 may be implemented by a host device or its components as described herein. For example, the operations of method 900 may be performed by a host device as described with reference to FIG. 7. In some examples, a host device may execute a set of instructions to control the functional elements of the host device to perform the described functions. Additionally or alternatively, a host device may perform aspects of the described functions using special-purpose hardware.

At 905, the method may include transmitting to a memory device a read command for a set of data. The operations of 905 may be performed according to the methods described herein. In some examples, aspects of the operations of 905 may be performed by a driver as described with reference to FIG. 7.

At 910, the method may include receiving the set of data from the memory device based on transmitting the read command. The operations of 910 may be performed according to the methods described herein. In some examples, aspects of the operations of 910 may be performed by a receiver as described with reference to FIG. 7.

At 915, the method may include receiving, from the memory device, a set of bits that is associated with the set of data and that indicates a type of error detected during a during an error detection procedure for the set of data, the type of error including a data bit error, a parity bit error, or a multi-bit error. The operations of 915 may be performed according to the methods described herein. In some examples, aspects of the operations of 915 may be performed by a receiver as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for transmitting to a memory device a read command for a set of data, receiving the set of data from the memory device based on transmitting the read command, and receiving, from the memory device, a set of bits that is associated with the set of data and that indicates a type of error detected during a during an error detection procedure for the set of data, the type of error including a data bit error, a parity bit error, or a multi-bit error.

Some examples of the method 900 and the apparatus described herein may further include operations, features, means, or instructions for determining the type of error detected during the error detection procedure based on respective logical values of the first bit, the second bit, and the third bit, and processing the set of data based on the determined type of error.

Some examples of the method 900 and the apparatus described herein may further include operations, features, means, or instructions for determining that the set of bits may have a set of logical values associated with the type of error, determining the type of error detected during the error detection procedure based on the set of logical values being associated with the type of error, and processing the set of data based on the determined type of error.

In some examples of the method 900 and the apparatus described herein, the set of bits may include operations, features, means, or instructions for determining a first logical value of the first bit and a second logical value of the second bit, determining the type of error detected during the error detection procedure based on the type of error being associated with the first logical value of the first bit and the second logical value of the second bit, and processing the set of data based on the determined type of error.

In some examples of the method 900 and the apparatus described herein, the type of error may include operations, features, means, or instructions for determining a third logical value of the third bit, where the address bit error may be determined based on the address bit error being associated with the third logical value of the third bit.

In some examples of the method 900 and the apparatus described herein, the apparatus may be configured to receive the set of bits at least partially overlapping in time with receiving the set of data. In some examples of the method 900 and the apparatus described herein, the apparatus may be configured to receive the set of bits over different conductive lines. In some examples of the method 900 and the apparatus described herein, the apparatus may be configured to receive the set of bits at different times over a same conductive line.

In some examples, the techniques described herein may be implemented by an apparatus. The apparatus may include a decoder configured to detect one or more errors in a codeword; a first logic gate coupled with the decoder and configured to perform a first logical OR operation on a first set of bits output from the decoder, the first set of bits representing error flags for a set of parity bits included in the codeword; and a second logic gate coupled with the decoder and configured to perform a second logical OR operation on a second set of bits output from the decoder, the second set of bits representing error flags for a set of data bits included in the codeword.

In some examples, the apparatus may include a first inverter coupled with the first logic gate and configured to invert a signal from the first logic gate that is based at least in part on the first logical OR operation; and a second inverter coupled with the second logic gate and configured to invert a signal from the second logic gate that is based at least in part on the second logical OR operation. In some examples, the apparatus may include a third logic gate coupled with the first inverter and the second inverter and configured to perform a logical AND operation on a signal from the first inverter and a signal from the second inverter. In some examples, the apparatus may include a fourth logic gate coupled with the decoder and configured to perform a logical OR operation on a set of syndrome bits for the codeword, wherein the third logic gate is configured to perform the logical AND operation on a signal from the fourth logic gate.

In some examples, the apparatus may include a third logic gate configured to perform a third logical OR operation on a signal from the first logic gate that is based at least in part on the first logical OR operation; and a fourth logic gate configured to perform a fourth logical OR operation on a signal from the second logic gate that is based at least in part on the second logical OR operation. In some examples, the apparatus may include fifth logic gate coupled with the decoder and configured to perform a logical OR operation on a set of syndrome bits for the codeword; and an inverter coupled with the fifth logic gate and configured to invert a signal from the fifth logic gate, wherein the third logic gate is configured to perform the third logical OR operation on a signal from the inverter, and wherein the fourth logic gate is configured to perform the fourth logical OR operation on the signal from the inverter.

In some examples, the apparatus may include a third logic gate coupled with the decoder and configured to perform a third logical OR operation on a third set of bits output from the decoder, the third set of bits representing error flags for a set of address bits included in the codeword. In some examples, the apparatus may include a fourth logic gate coupled with the first logic gate and configured to perform a fourth logical OR operation on a signal from the first logic gate; a fifth logic gate coupled with the second logic gate and configured to perform a fifth logical OR operation on a signal from the second logic gate; and a sixth logic gate coupled with the third logic gate and configured to perform a sixth logical OR operation on a signal from the third logic gate. In some examples, the apparatus may include a seventh logic gate coupled with the decoder and configured to perform a seventh logical OR operation on a set of syndrome bits for the codeword; and an inverter coupled with the seventh logic gate and configured to invert a signal from the seventh logic gate, wherein the fourth logic gate is configured to perform the fourth logical OR operation on a signal from the inverter, the fifth logic gate is configured to perform the fifth logical OR operation on the signal from the inverter, and the sixth logic gate is configured to perform the sixth logical OR operation on the signal from the inverter.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a decoder configured to detect one or more errors in a codeword;
a first logic gate coupled with the decoder and configured to perform a first logical OR operation on a first set of bits output from the decoder, the first set of bits representing error flags for a set of parity bits included in the codeword; and
a second logic gate coupled with the decoder and configured to perform a second logical OR operation on a second set of bits output from the decoder, the second set of bits representing error flags for a set of data bits included in the codeword.

2. The apparatus of claim 1, further comprising:
a first inverter coupled with the first logic gate and configured to invert a signal from the first logic gate that is based at least in part on the first logical OR operation; and
a second inverter coupled with the second logic gate and configured to invert a signal from the second logic gate that is based at least in part on the second logical OR operation.

3. The apparatus of claim 2, further comprising:
a third logic gate coupled with the first inverter and the second inverter and configured to perform a logical AND operation on a signal from the first inverter and a signal from the second inverter.

4. The apparatus of claim 3, further comprising:
a fourth logic gate coupled with the decoder and configured to perform a logical OR operation on a set of syndrome bits for the codeword, wherein the third logic gate is configured to perform the logical AND operation on a signal from the fourth logic gate.

5. The apparatus of claim 1, further comprising:
a third logic gate configured to perform a third logical OR operation on a signal from the first logic gate that is based at least in part on the first logical OR operation; and
a fourth logic gate configured to perform a fourth logical OR operation on a signal from the second logic gate that is based at least in part on the second logical OR operation.

6. The apparatus of claim 5, further comprising:
a fifth logic gate coupled with the decoder and configured to perform a logical OR operation on a set of syndrome bits for the codeword; and
an inverter coupled with the fifth logic gate and configured to invert a signal from the fifth logic gate, wherein the third logic gate is configured to perform the third logical OR operation on a signal from the inverter, and wherein the fourth logic gate is configured to perform the fourth logical OR operation on the signal from the inverter.

7. The apparatus of claim 1, further comprising:
a third logic gate coupled with the decoder and configured to perform a third logical OR operation on a third set of bits output from the decoder, the third set of bits representing error flags for a set of address bits included in the codeword.

8. The apparatus of claim 7, further comprising:
a fourth logic gate coupled with the first logic gate and configured to perform a fourth logical OR operation on a signal from the first logic gate;
a fifth logic gate coupled with the second logic gate and configured to perform a fifth logical OR operation on a signal from the second logic gate; and
a sixth logic gate coupled with the third logic gate and configured to perform a sixth logical OR operation on a signal from the third logic gate.

9. The apparatus of claim 8, further comprising:
a seventh logic gate coupled with the decoder and configured to perform a seventh logical OR operation on a set of syndrome bits for the codeword; and
an inverter coupled with the seventh logic gate and configured to invert a signal from the seventh logic gate, wherein the fourth logic gate is configured to perform the fourth logical OR operation on a signal from the inverter, the fifth logic gate is configured to perform the fifth logical OR operation on the signal from the inverter, and the sixth logic gate is configured to perform the sixth logical OR operation on the signal from the inverter.

10. A method performed by a memory device, the method comprising:
performing, by a decoder, an error detection procedure for a codeword protected by an error correction code;
outputting, by the decoder based at least in part on the error detection procedure, a first set of bits that represent error flags for a set of parity bits included in the codeword and second set of bits that represent error flags for a set of data bits included in the codeword;
performing a first logical OR operation on the first set of bits that represent error flags for the set of parity bits included in the codeword; and
performing a second logical OR operation on the second set of bits that represent error flags for the set of data bits included in the codeword.

11. The method of claim 10, further comprising:
inverting a first signal that is based at least in part on the first logical OR operation; and
inverting a second signal that is based at least in part on the second logical OR operation.

12. The method of claim 11, further comprising:
performing a logical AND operation on the inverted first signal and the inverted second signal.

13. The method of claim 12, further comprising:
performing a third logical OR operation on a set of syndrome bits for the codeword, wherein the logical AND operation is performed on a third signal that is based at least in part on the third logical OR operation.

14. The method of claim 10, further comprising:
performing a third logical OR operation on a first signal that is based at least in part on the first logical OR operation; and
performing a fourth logical OR operation on a second signal that is based at least in part on the second logical OR operation.

15. The method of claim 14, further comprising:
performing a fifth logical OR operation on a set of syndrome bits for the codeword; and
inverting a third signal that is based at least in part on the fifth logical OR operation, wherein the third logical OR operation is performed on the inverted third signal and the fourth logical OR operation is performed on the inverted third signal.

16. The method of claim 10, wherein the decoder outputs a third set of bits that represent error flags for a set of address bits included in the codeword, the method further comprising:
performing a third logical OR operation on the third set of bits that represent error flags for the set of address bits included in the codeword.

17. The method of claim 16, further comprising:
performing a fourth logical OR operation on a first signal that is based at least in part on the first logical OR operation;
performing a fifth logical OR operation on a second signal that is based at least in part on the second logical OR operation; and
performing a sixth logical OR operation on a third signal that is based at least in part on the third logical OR operation.

18. The method of claim 17, further comprising:
performing a seventh logical OR operation on a set of syndrome bits for the codeword; and
inverting a fourth signal that is based at least in part on the seventh logical OR operation, wherein the fourth logical OR operation, the fifth logical OR operation, and the sixth logical OR operation are performed on the inverted fourth signal.

19. An apparatus, comprising:
a controller configured to be coupled with a memory device, wherein the controller is configured to cause the apparatus to:
transmit to the memory device a read command for a set of data included in a codeword that also includes parity bits;
receive the set of data from the memory device based at least in part on transmitting the read command; and
receive, from the memory device, a set of error-indication bits that is associated with the codeword, the set of error-indication bits comprising: a first error-indication bit that is based at least in part on a first set of error-indication bits for the set of data in the codeword, and a second error-indication bit that is based at least in part on a second set of error-indication bits for the parity bits in the codeword;
and determine, based at least in part on the set of error-indication bits, a type of error detected during an error detection procedure for the codeword, the type of error comprising a data bit error, a parity bit error, or a multi-bit error.

20. The apparatus of claim 19, wherein the first error-indication bit is associated with a single data bit error, the second error-indication bit is associated with a single parity bit error, and wherein the controller is further configured to cause the apparatus to:
determine the type of error detected during the error detection procedure based at least in part on respective logical values of the first error-indication bit, and the second error-indication bit; and
process the set of data based at least in part on the determined type of error.

21. The apparatus of claim 19, wherein the controller is further configured to cause the apparatus to:
determine that the set of error-indication bits has a set of logical values associated with the type of error;
determine the type of error detected during the error detection procedure based at least in part on the set of logical values being associated with the type of error; and
process the set of data based at least in part on the determined type of error.

22. The apparatus of claim 19, wherein the controller is further configured to cause the apparatus to:
determine a first logical value of the first error-indication bit and a second logical value of the second error-indication bit;
determine the type of error detected during the error detection procedure based at least in part on the type of error being associated with the first logical value of the first error-indication bit and the second logical value of the second error-indication bit; and
process the set of data based at least in part on the determined type of error.

23. The apparatus of claim 22, wherein the type of error comprises an address bit error and the set of error-indication bits comprises a third error-indication bit, and wherein the controller is further configured to cause the apparatus to:

determine a third logical value of the third error-indication bit, wherein the address bit error is determined based at least in part on the address bit error being associated with the third logical value of the third error-indication bit.

24. The apparatus of claim 19, wherein the apparatus is configured to receive the set of error-indication bits at least partially overlapping in time with receiving the set of data.

25. The apparatus of claim 19, wherein the apparatus is configured to receive the set of error-indication bits over different conductive lines.

26. The apparatus of claim 19, wherein the apparatus is configured to receive the set of error-indication bits at different times over a same conductive line.

* * * * *